United States Patent
Yoshinari

(10) Patent No.: US 7,815,321 B2
(45) Date of Patent: *Oct. 19, 2010

(54) ANTIGLARE FILM

(75) Inventor: Tomo Yoshinari, Tokyo (JP)

(73) Assignee: Toppan Printing Co., Ltd. (JP)

( * ) Notice: Subject to any disclaimer, the term of this patent is extended or adjusted under 35 U.S.C. 154(b) by 413 days.

This patent is subject to a terminal disclaimer.

(21) Appl. No.: 11/899,829

(22) Filed: Sep. 6, 2007

(65) Prior Publication Data

US 2008/0212187 A1 Sep. 4, 2008

(30) Foreign Application Priority Data

Mar. 2, 2007 (JP) .............................. 2007-052513

(51) Int. Cl.
G02B 13/20 (2006.01)
G02B 5/02 (2006.01)

(52) U.S. Cl. ...................... 359/601; 359/599

(58) Field of Classification Search ................ 359/599, 359/601, 707

See application file for complete search history.

(56) References Cited

U.S. PATENT DOCUMENTS

| | | | |
|---|---|---|---|
| 5,387,463 A | 2/1995 | Nakamura et al. | |
| 6,111,699 A | 8/2000 | Iwata et al. | |
| 6,217,176 B1 | 4/2001 | Maekawa | |
| 6,327,088 B1 | 12/2001 | Iwata et al. | |
| 6,343,865 B1 | 2/2002 | Suzuki | |
| 6,480,249 B2 | 11/2002 | Iwata et al. | |
| 6,696,140 B2 | 2/2004 | Suzuki | |
| 6,852,376 B2 * | 2/2005 | Chien et al. ................. | 428/1.3 |
| 7,033,638 B2 | 4/2006 | Suzuki | |
| 7,095,464 B2 * | 8/2006 | Ito .............................. | 349/112 |
| 7,119,873 B2 * | 10/2006 | Kawanishi et al. ........... | 349/194 |
| 7,190,525 B2 * | 3/2007 | Ito et al. ...................... | 359/599 |
| 7,589,897 B2 * | 9/2009 | Kameshima et al. ......... | 359/599 |
| 2002/0150722 A1 | 10/2002 | Suzuki | |
| 2004/0071986 A1 * | 4/2004 | Shoshi et al. ............... | 428/446 |
| 2004/0150874 A1 | 8/2004 | Suzuki | |
| 2008/0186582 A1 * | 8/2008 | Matsuura et al. ........... | 359/601 |

FOREIGN PATENT DOCUMENTS

| | | |
|---|---|---|
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-149413 | 5/2003 |
| JP | 2003-260748 | 9/2003 |
| JP | 2004-004777 | 1/2004 |
| JP | 2004-082613 | 3/2004 |
| JP | 2004-125958 | 4/2004 |

\* cited by examiner

Primary Examiner—Thong Nguyen
(74) Attorney, Agent, or Firm—Squire, Sanders & Dempsey L.L.P.

(57) ABSTRACT

An antiglare film is disclosed comprising of an antiglare layer having a surface irregularity on a transparent base material, wherein the antiglare layer includes a binder matrix, an organic particle A and a particle B, and the value that an average particle size of the organic particle A is divided by an average film thickness of the antiglare layer is in the range of 0.4 to 0.7, and the value that an average particle size of the particle B is divided by an average particle size of the organic particle A is in the range of 0.3 to 0.7, and the content of the particle B relative to the organic particle A in the antiglare layer is in the range of 50 wt % to 200 wt %.

7 Claims, 2 Drawing Sheets

(a)

(b)

ANTIGLARE FILM

CROSS REFERENCE

This application claims priority to Japanese application number 2007-052513, filed on Mar. 2, 2007, which is incorporated by reference.

BACKGROUND OF THE INVENTION

1. Field of the Invention

The present invention relates to an antiglare film to be provided on the surface of a window, display etc. In particular, it relates to an antiglare film to be provided on the surface of such displays as a liquid crystal display (LCD), CRT display, organic electroluminescence display (ELD), plasma display (PDP), surface-conduction electron-emitter display (SED) and field effect display (FED).

2. Description of the Related Art

Displays such as a liquid crystal display, CRT display, EL display and plasma display have some problems described below from the viewpoint of visibility.

External light reflects at looking and listening.

Surface glare (scintillation) occurs at the display surface by display light from the display.

Visibility is not good caused by dazzle of display light directly coming from the display without being diffused, etc.

Visibility is also degraded by such defect as unevenness of brightness.

In order to solve such lowering or degradation of visibility, it is known to arrange an antiglare film on the front face of a display.

As an antiglare film, for example, following techniques are known:

To arrange, on the surface of a display, an antiglare film having an antiglare layer having been subjected to embossing finish.

To arrange, on the surface of a display, an antiglare film having an antiglare layer on the surface of which is formed irregularity by mixing particles in a binder matrix.

In such antiglare layer, scattering phenomenon (surface diffusion) of light caused by surface irregularity is utilized.

Further, such antiglare layer is also known that, by mixing particles having a refraction index different from that of a binder matrix into the binder matrix, utilizes internal scattering (internal diffusion) of light based on the difference in refraction indices of the binder matrix and particles.

In an antiglare layer on the surface where irregularity is formed through embossing finish, the surface irregularity thereof can be completely controlled.

Consequently, reproducibility is good. However, when there is a defect or an adhered foreign substance on an emboss roll, endless defects occurs at the pitch of roll. Consequently, in the case of mass production, all the products have defect. Further, since the scattering only at the surface is utilized, there are following problems:

Abrasion resistance

Lowering of contrast

Occurrence of scintillation.

An antiglare film using a binder matrix and particles can be manufactured through a smaller number of processes than the antiglare film using embossing finish. Therefore, it can be manufactured inexpensively. Therefore, various embodiments of antiglare film are known (Patent Document 1).

In order to exert sufficient light diffusing performance, it is necessary to form a certain degree of surface irregularity on the surface of an antiglare film. However, there are following problems:

Lowering of contrast

Occurrence of scintillation caused by lens effect of the surface irregularity

Lowering of abrasion resistance

In addition, as methods for preventing the lowering of contrast and the occurrence of scintillation mentioned above, following techniques are known:

To improve transmission light and reflection light scattering performance by making irregularity figure of the surface large.

To improve transmission light by increasing the amount of particles to be added.

However, there is such a problem in the methods that the sharpness of a transmitted image is lowered.

As methods for improving the visibility etc. without lowering light scattering performance or the like, following techniques are known:

A technique in which binder matrix resin, spherical particles and amorphous particles are used in combination (Patent Document 2).

A technique in which binder matrix resin and plural particles having different particle sizes are used (Patent Document 3).

A technique including surface irregularity, wherein the cross-sectional area of the concave portion is defined (Patent Document 4).

In addition, in order to improve the visibility without lowering light scattering performance etc., there is also known such technique that uses scattering in an antiglare film and scattering at the surface of an antiglare film in combination.

The scattering within an antiglare film (internal diffusion) occurs by dispersing particles having a different refraction index from that of the binder matrix in a binder matrix such as resin.

The combined use of internal scattering and surface scattering leads to smaller surface irregularity compared with an antiglare film using surface scattering alone. Therefore, there are following advantages:

Improvement of contrast

Reduction of dazzling caused by lens effect of the surface irregularity

Improvement of abrasion resistance

For example, as the technique using internal scattering and surface scattering in combination, following techniques are known:

A technique wherein the internal haze (cloudiness) is 1-15%, and the surface haze (cloudiness) is 7-30% (Patent Documents 5, 6).

A technique wherein, while using binder resin and particles having the particle size of 0.5-5 μm, the difference in refraction indices of the resin and the particle is 0.02-0.2 (Patent Document 7).

A technique wherein, while using binder resin and particles having the particle size of 1-5 μm, the difference in refraction indices of the resin and the particle is 0.05-0.15. Further, techniques defining a solvent to be used, surface roughness etc. (Patent Documents 8, 9, 10, 11, 12).

A technique wherein, using binder resin and plural types of particles, the difference in refraction indices of the resin and the particle is 0.03-0.2 (Patent Documents 13, 14).

There are also known following techniques that reduce lowering of contrast, hue variation etc. when a viewing angle is altered: In the technique, the surface haze (cloudiness) is 3 or more. Further, the difference between the haze value in the direction of normal line and the haze value in the direction of ±60° is 4 or less (Patent Documents 15, 16, 17, 18). A technique wherein center line average roughness (Ra) is 0.2 μm or less is also known (Patent Document 19). A technique wherein the center line average roughness (Ra) is 0.02-1 μm, and the ten point average roughness (Rz)/Ra is 30 or less is also known (Patent Document 20, 21).

Since an antiglare film is mainly arranged on the front face of a display, abrasion resistance is required. In order to improve the abrasion resistance, it is necessary to improve the hardness of an antiglare film. Therefore, there is known such technique as using an ionizing radiation-curing resin binder, silica particles and silicone particles in order to manufacture an antiglare film having a high hardness without lowering the display image quality of a display (Patent Document 21).

In an antiglare film having particles and a binder matrix on a transparent base material, it is desirable that an average particle size of a particle is smaller than an average film thickness of an antiglare layer. The reason is, in the case where an average particle size of a particle is equal to or more than an average film thickness of an antiglare layer, optical property of an antiglare layer changes mercurially for a film thickness fluctuation of an antiglare layer. In the case where an average particle size of a particle is equal to or more than an average film thickness of the antiglare layer, even if the film thickness fluctuation occurring in machinery coating is equal to or less than ±5%, the difference is easily recognized visually, and nonuniformity in appearance appears notably. Therefore, when an antiglare film is manufactured, probability of occurrence of defective appearance becomes high, and there is a problem such that deterioration in the productivity can be easily caused.

On the other hand, in the case where an antiglare layer is formed by using a particle whose average particle size is smaller than an average film thickness of an antiglare layer, control of dispersion property of a particle becomes important. In the antiglare layer, particles often aggregate without dispersing, and when a particle aggregate, the convex portion having a big difference of height is formed on the surface of an antiglare layer, therefore the external light reflection preventive property (antiglare property) can be obtained, however, there is a problem such that the image sharpness property is drastically lowered.

In particular, in the case where an organic particle comprising an organic material is used as a particle, specific gravity of an organic particle is often equal to or less than a binder matrix, an organic particle is hard to be buried into an antiglare layer, and the above-mentioned problem becomes notable.

Therefore, in the present invention, one purpose is to provide an antiglare film having a high image sharpness property in an antiglare layer including a particle whose average particle size is less than an average film thickness of an antiglare layer.

[Patent Document 1] U.S. Pat. No. 5,387,463
[Patent Document 2] JP-A-2003-260748
[Patent Document 3] JP-A-2004-004777
[Patent Document 4] JP-A-2003-004903
[Patent Document 5] Japanese Patent No. 3507719
[Patent Document 6] U.S. Pat. No. 6,343,865
[Patent Document 7] JP-A-11-326608
[Patent Document 8] Japanese Patent No. 3515426
[Patent Document 9] U.S. Pat. No. 6,696,140
[Patent Document 10] U.S. Pat. No. 7,033,638
[Patent Document 11] US Patent Published Application No. 2002-0150722
[Patent Document 12] US Patent Published Application No. 2004-0150874
[Patent Document 13] Japanese Patent No. 3515401
[Patent Document 14] U.S. Pat. No. 6,217,176
[Patent Document 15] JP-A-11-160505
[Patent Document 16] U.S. Pat. No. 6,111,699
[Patent Document 17] U.S. Pat. No. 6,327,088
[Patent Document 18] U.S. Pat. No. 6,480,249
[Patent Document 19] JP-A-2003-149413
[Patent Document 20] JP-A-2004-125958
[Patent Document 21] JP-A-2004-082613
[Patent Document 22] US Patent Published Application No. 2004-0071986

SUMMARY OF THE INVENTION

One embodiment of the present invention is an antiglare film comprising an antiglare layer having a surface irregularity on a transparent base material, wherein the antiglare layer includes a binder matrix, an organic particle A and a particle B, and the value that an average particle size of the organic particle A is divided by an average film thickness of the antiglare layer is in the range of 0.4 to 0.7, and the value that an average particle size of the particle B is divided by an average particle size of the organic particle A is in the range of 0.3 to 0.7, and the content of the particle B relative to the organic particle A in the antiglare layer is in the range of 50 wt % to 200 wt %.

DESCRIPTION OF REFERENCE NUMERALS

| | |
|---|---|
| 1 | antiglare film |
| 11 | transparent base material |
| 120 | binder matrix |
| 12A | organic particle A |
| 12B | particle B |
| H | average film thickness of an antiglare layer |
| ra | average particle size of an organic particle A |
| rb | average particle size of a particle B |
| 2 | polarizing plate |
| 21 | transparent base material |
| 22 | transparent base material |
| 23 | polarizing layer |
| 3 | liquid crystal cell |
| 4 | polarizing plate |
| 41 | transparent base material |
| 42 | transparent base material |
| 43 | polarizing layer |
| 5 | backlight unit |
| 7 | polarizing plate unit |

DESCRIPTION OF THE PREFERRED EMBODIMENTS

An antiglare film of one embodiment of the present invention is described below.

Figure 1:
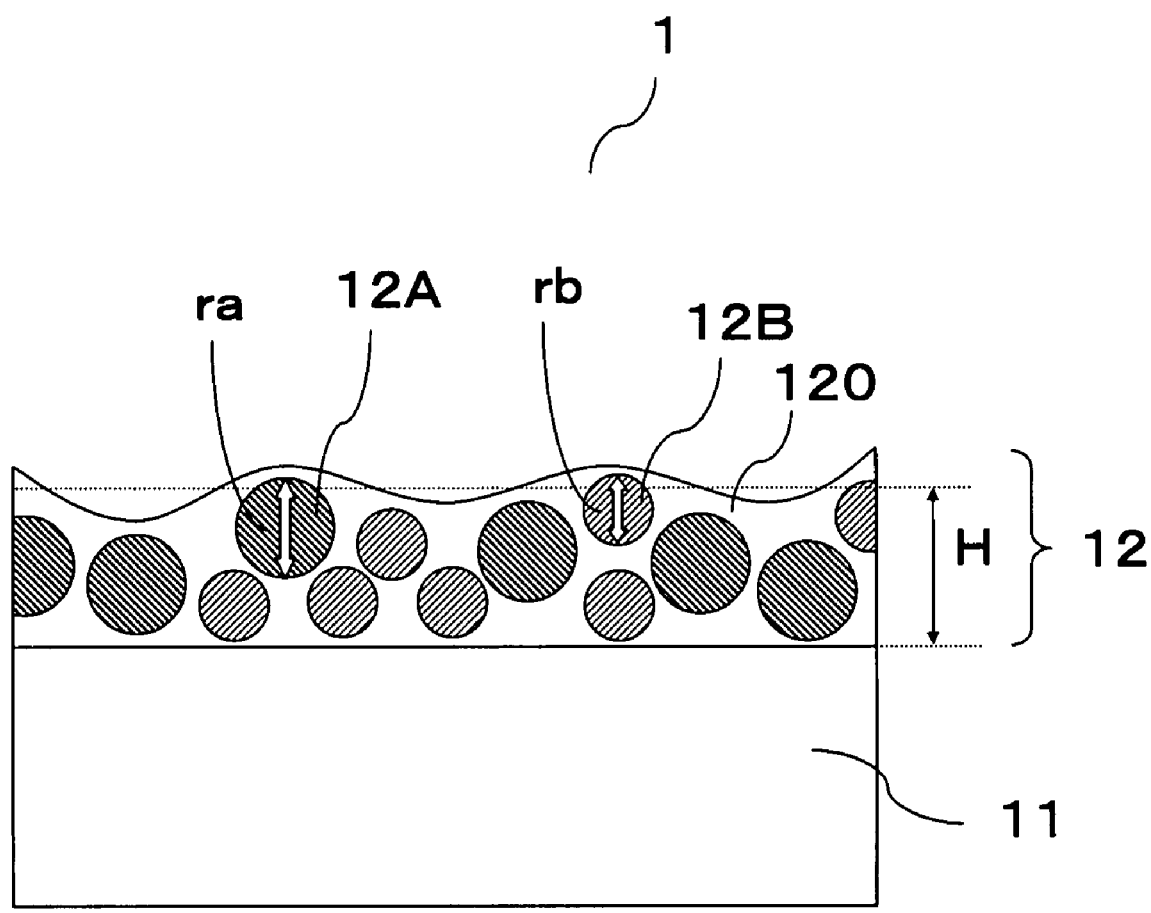
FIG. 1 is a cross-exemplary diagram of an antiglare film of an embodiment of the present invention.

FIG. 1 is a cross-exemplary diagram of an antiglare film of an embodiment of the present invention. An antiglare film (1) can have an antiglare layer (12) on a transparent base material (11). An antiglare layer (12) of an antiglare film (1) includes a binder matrix (120), an organic particle A (12A) and a particle B (12B). In an antiglare film of an embodiment of the present invention, the value that an average particle size (ra) of an organic particle A (12A) is divided by an average film thickness of an antiglare layer (H) is in the range of 0.4 to 0.7, the value that an average particle size (rb) of a particle B (12B) is divided by an average particle size (ra) of an organic particle A is in the range of 0.3 to 0.7, and the content of a particle B relative to an organic particle A in an antiglare layer is in the range of 50 wt % to 200 wt %.

An antiglare film of the present invention controls localization of an organic particle A in an antiglare layer by adding a particle B to an antiglare layer including an organic particle A and a binder matrix wherein the value that the average particle size (ra) is divided by an average film thickness of the antiglare layer (H) is in the range of 0.4 to 0.7, thereby an antiglare film having a high image sharpness property is obtained. An inventor of the present invention found that it became possible to prevent an aggregation of an organic particle A by a steric barrier, and to control localization of an organic particle A in an antiglare layer, by adding a particle B to an antiglare layer having an organic particle A and a binder matrix. Further, localization of an organic particle A in an antiglare layer could be controlled, and an antiglare film having a good image sharpness property is obtained by including a particle B in an antiglare layer, wherein the value that the average particle size of a particle B is divided by an average particle size of an organic particle A (ra) is in the range of 0.3 to 0.7, and wherein the content of a particle B relative to an organic particle A is in the range of 50 wt % to 200 wt %.

In an antiglare film of an embodiment of the present invention, the value that an average particle size (ra) of an organic particle A (12A) is divided by an average film thickness of the antiglare layer (H) is in the range of 0.4 to 0.7. In the case where the value that an average particle size (ra) of an organic particle A (12A) is divided by an average film thickness of the antiglare layer (H) is more than 0.7, optical property of a formed antiglare layer changes for a film thickness fluctuation of an antiglare layer subtly, fluctuation of a film thickness at coating are easily recognized visually, and probability of occurrence of defective appearance becomes high. On the other hand, in the case where the value that an average particle size (ra) of an organic particle A (12A) is divided by an average film thickness of the antiglare layer (H) is less than 0.4, it becomes difficult to form enough irregularities to prevent the reflection of external light at the surface of an antiglare layer, and the enough external light reflection preventive property (antiglare property) can not be obtained.

Further, in an antiglare film of an embodiment of the present invention, the value that an average particle size (rb) of a particle B (12B) is divided by an average particle size (ra) of an organic particle A (12A) is in the range of 0.3 to 0.7. In the case where the value that an average particle size (rb) of particle B (12B) is divided by an average particle size of an organic particle A (12A) is more than 0.7, image sharpness property of an antiglare film obtained by a particle B is lost. On the other hand, the value that an average particle size (rb) of particle B (12B) is divided by an average particle size (ra) of an organic particle A (12A) is less than 0.4, it becomes difficult to prevent localization of an organic particle A, and image sharpness property is lost.

Further, in an antiglare film of the present invention, the content of a particle B (12B) relative to an organic particle A (12A) in an antiglare layer is in the range of 50 wt % to 200 wt %. In the case where the content of a particle B relative to an organic particle A is less than 50 wt %, it becomes impossible to prevent localization of an organic particle A by a particle B, and image sharpness property is lowered. Further, in the case where the content of a particle B relative to an organic particle A is more than 200 wt %, image sharpness property of an antiglare film is lowered because of localization of a particle B.

Further, in an antiglare film of an embodiment of the present invention, the content of an organic particle A (12A) relative to a binder matrix is preferably 6 wt % to 18 wt %. In the case where the content of an organic particle A relative to a binder matrix is less than 6 wt %, an antiglare film may not be able to have the enough external light reflection preventive property. And in the case where the content of an organic particle A relative to a binder is more than 18 wt %, the contents of particles comprised of an organic particle A and a particle B become too much in a coating liquid to coat an antiglare layer, so preservation stability of coating liquid may be lost, and defective appearance easily occurs.

Further, in the present invention, it is desirable that the content of a fluorinated material relative to a binder matrix is in the range of 0.07-0.9 wt %. In the case where an organic particle A is not localized but almost completely dispersed in an antiglare layer, the enough external light reflection preventive property may not be able to be obtained while the film has a high image sharpness property. At this time, a degree of localization of an organic particle A can be adjusted by including a fluorinated material in an antiglare layer. In the case where the content of a fluorinated material relative to an antiglare layer is less than 0.07 wt %, a sufficient external light reflection preventive property may not be able to be obtained. On the other hand, in the case where the content of a fluorinated material relative to an antiglare layer is more than 0.9 wt %, a degree of aggregation of an organic particle A becomes too high, and image sharpness property may be lowered.

Further, it is desirable that an organic particle A is a polystyrene particle in the present invention. In the case where a polystyrene particle is only included in a binder matrix, a polystyrene particle tends to be localized by aggregation in an antiglare layer. It becomes possible to control localization of a polystyrene particle by including a particle B in addition to a polystyrene particle.

In addition, in the present invention, an antiglare film thickness of an antiglare layer (H) can mean an average value of a film thickness of an antiglare layer having surface irregularities. An average film thickness can be measured by using an electronic micrometer or a full automatic detailed configuration measurement machine. Further, an average particle size of an organic particle A and the same of a particle B, used in the present invention, can be measured by using a method for measuring particle diameter distribution based on light scattering.

Further, in an antiglare film of the present invention, the average film thickness H is preferably in the range of 4 μm to 20 μm. In the case where an average film thickness is less than 4 μm, a sufficient hardness to arrange the film on the front face of a display can not be obtained. Further, in the case where the average film thickness is more than 20 μm, the cost becomes high.

Further, in the present invention, an organic particle A and a particle B, used in an antiglare layer, are preferably different kind. But, they can be same kind. When a particle A and a particle B are same kind, it is desirable that an average particle size of a particle B is equal to or more than the value that an average particle size of an organic particle A is multiplied by 0.3, and equal to or less than the value that the same is multiplied by 0.5. That is, the difference between an average particle size of an organic particle A and the same of a particle B is big enough, an organic particle A and a particle B can be same kind.

In addition, in the present invention, a refraction index of a binder matrix can mean a refraction index of a film after forming a film with a binder matrix. A refraction index of a binder matrix and the same of a particle can be measured according to the Becke line-detecting method (immersion method).

Further, in an antiglare film of the present invention, to the binder matrix, other functional additives may be added. But, other functional additives must not affect transparency, light diffuseness etc. As functional additives, an antistatic agent, an ultraviolet absorber, an infrared absorber, an antifouling agent, a water repellent agent, a refraction index-adjusting agent, an adhesiveness-improving agent and a curing agent etc. can be used. An antiglare layer of the present invention can have functions such as an antistatic function, an ultraviolet absorbing function, an infrared absorbing function, an antifouling function and a water repellent function besides an antiglare function.

Further, an antiglare film of the present invention can provide a functional layer having a performance such as reflection preventing performance, antistatic performance, antifouling performance, electromagnetic shield performance, infrared absorbing performance, ultraviolet absorbing performance and color correcting performance, if necessary. Examples of these functional layers include a reflection preventing layer, an antistatic layer, an antifouling layer, an electromagnetic shield layer, an infrared absorbing layer, an ultraviolet absorbing layer, a color correcting layer or the like. In addition, these functional layers may consist of one layer or plural layers. A functional layer may consist of one layer having plural functions. For example, a functional layer is a reflection preventing layer having antifouling performance. In addition, to improve adhesion property between a transparent base material and an antiglare layer or between some kinds of layers, a primer layer, an adhesion layer or the like can be provided between some layers. A reflection preventing layer may consist of single layer of low refraction index layer on an antiglare layer or may consist of plural layers which a low refraction index layer and a high refraction index layer are repeated.

An antiglare film of the present invention can be used for a surface at a observer side of various displays such as a liquid crystal display (LCD), a CRT display, an organic electroluminescence display (ELD), a plasma display (PDP), surface-conduction electron-emitter display (SED), field emission display (FED). An antiglare film of the present invention provides an antiglare film which is superior in the external light reflection preventive property and is superior in contrast in the case where the film is used for a display.

Figure 2:
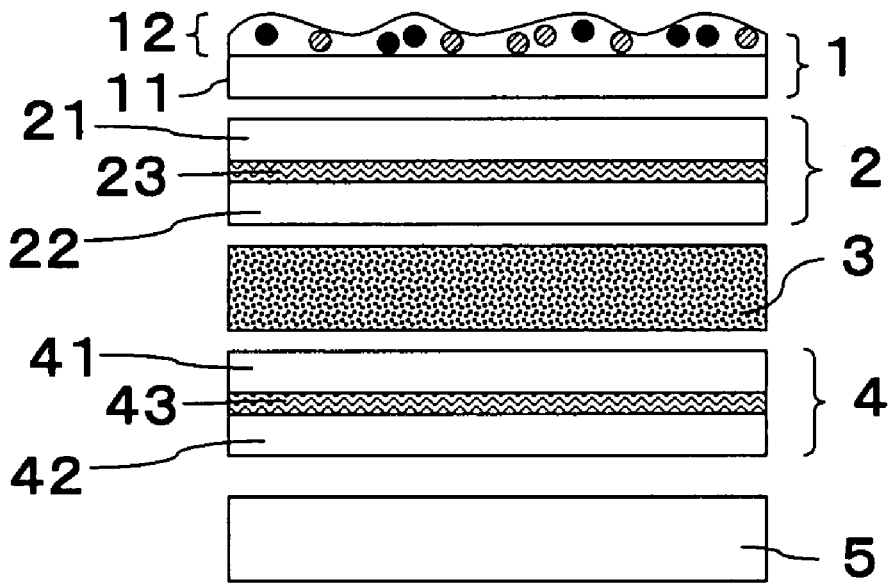
FIGS. 2(a) and 2(b) are cross-exemplary diagrams of a transmission type liquid crystal display using an antiglare film of embodiments of the present invention.
Figure 2:
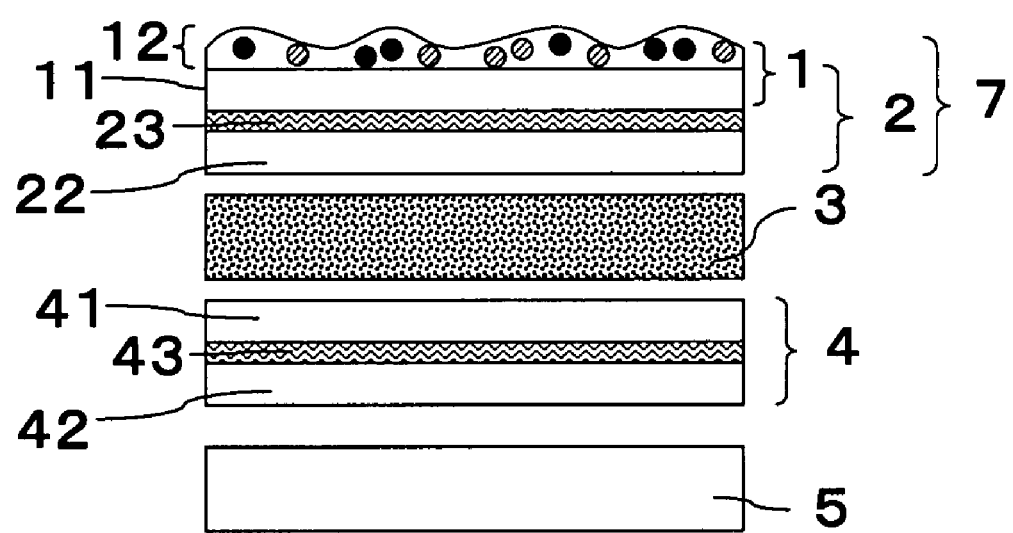

FIG. 2 is a cross-exemplary diagram showing a transmission type liquid crystal display using an antiglare film of an embodiment of the present invention. A transmission type liquid crystal display shown in FIG. 2 (a) has a backlight unit (5), a polarizing plate (4), a liquid crystal cell (3), a polarizing plate (2) and an antiglare film (1) in this order. At this time, an antiglare film (1) side is an observer side, that is, a front surface of a display.

A backlight unit (5) is comprised of a light source and a light diffusing plate. As for a liquid crystal cell, an electrode is provided on a transparent base material in one side, an electrode and a color filter are provided on a transparent base material in another side and a liquid crystal is encapsulated between both of the electrodes. As for polarizing plates sandwiching a liquid crystal cell (3), polarizing layers (23, 43) are between transparent base materials (21, 22, 41 and 42).

A transmission type liquid crystal display shown in FIG. 2 (b) has a backlight unit (5), a polarizing plate (4), a liquid crystal cell (3) and a polarizing plate unit (7) which a polarizing plate (2) combines with an antiglare film (1), in this order.

As for an antiglare film used for a liquid crystal display, as shown in FIG. 2 (b), a polarizing layer (23) may be provided on a surface of a transparent base material (11) opposite to a surface where an antiglare layer (12) is formed, and the transparent base material (11) may be used as a polarizing plate.

Next, a manufacturing method of an antiglare film is described below.

As a base material for use in an antiglare film of the present invention, glass, a plastic film etc. can be used. As a plastic film, a proper degree of transparency and mechanical strength are required. For example, such films as polyethylene terephthalate (PET), triacetylcellulose (TAC), diacetylcellulose, acetylcellulose butyrate, polyethylene naphthalate (PEN), cycloolefine polymer, polyimide, polyether sulfone (PES), polymethyl methacrylate (PMMA) and polycarbonate (PC) can be used.

Among them, in the case where an antiglare film is used on the front face of a liquid crystal display etc., triacetylcellulose (TAC) is used preferably because it does not show optical anisotropy. Further, a polarizing plate may be used as a base material. There is no particular limitation on a polarizing plate to be used. For example, such polarizing plate can be used that has a stretched polyvinyl alcohol (PVA) added with iodine as a polarizing layer between a pair of triacetylcellulose (TAC) films being the support for the polarizing layer. A polarizing plate composed of a triacetylcellulose (TAC) film and a stretched PVA added with iodine has a high polarization degree and can be used suitably for a liquid crystal display etc. In this case, an antiglare layer can be provided on one of triacetylcellulose (TAC) films.

Further, in a transparent base material of the present invention, from the viewpoint of optical property, mechanical strength, handleability etc., a thickness of a base material is preferably 10-500 μm.

Further, to the base material, an additive may be added. Examples of the additive include an ultraviolet absorber, infrared absorber, antistatic agent, refraction index-adjusting agent and reinforcing agent etc.

For a binder matrix for use in an antiglare layer, following properties are required:

When a film is formed using a binder matrix, the film has a proper degree of transparency and mechanical strength.

Added particles are dispersed in a binder matrix.

For example, ionizing radiation-curable resin such as ultraviolet ray-curable resin and electron beam-curable resin, heat-curable resin, thermoplastic resin, and an inorganic or organic-inorganic composite matrix obtained by hydrolyzing and dehydration-condensing metal alkoxide can be used.

Further, examples of the heat-curable resin include heat curable type urethane resin composed of acrylic polyol and isocyanate prepolymer, phenol resin, urea-melamine resin, epoxy resin, unsaturated polyester resin and silicone resin etc.

Examples of the ionizing radiation-curable resin include polyfunctional acrylate resin such as acrylic or methacrylic ester of polyhydric alcohol, and polyfunctional urethane acrylate synthesized from diisocyanate, polyhydric alcohol and hydroxyl ester of acrylic acid or methacrylic acid. In addition to these examples, polyether resin having an acrylate-based functional group, polyester resin, epoxy resin, alkyd resin, spiroacetal resin, polybutadiene resin, polythiolpolyene resin etc. can be also used.

Among the ionizing radiation-curable resin, in the case where ultraviolet ray-curable resin is used, a photopolymerization initiator is added. Any photopolymerization initiator may be usable, but the use of one suitable for a resin to be used is preferred.

As the photopolymerization initiator (radical polymerization initiator), benzoin and alkyl ethers thereof such as benzoin, benzoinmethylether, benzomethylether, benzoinisopropylether and benzylmethylketal are used. The use amount of the photoinitiator is 0.5-20 wt %, preferably 1-5 wt % relative to the resin.

Examples of the usable thermoplastic resin include cellulose derivatives such as acetylcellulose, nitrocellulose, acetylbutylcellulose, ethylcellulose and methylcellulose, vinyl-based resins such as vinyl acetate and copolymer thereof, vinyl chloride and copolymer thereof and vinylidene chloride and copolymer thereof, acetal resin such as polyvinyl formal and polyvinyl butyral, acrylic resin such as acrylate resin and copolymer thereof and methacrylate resin and copolymer thereof, polystyrene resin, polyamide resin, linear polyester resin and polycarbonate resin etc.

Examples of the usable inorganic or organic-inorganic composite matrix include materials using silicon oxide-based matrix employing a silicon alcoxide-based material as a starting material. For example, tetraethoxysilane can be used.

Further, in the case where the base material is made of a plastic film, in order to supply mechanical strength, a binder matrix having a high hardness is preferably used. Specifically, curable resin, and inorganic or organic-inorganic composite matrix obtained by hydrolyzing and dehydration-condensing metal alkoxide can be used. In particular, in the case where a plastic film having a thickness of 100 μm or less is used, the use of a binder matrix having a high hardness is preferred. In particular, in a binder matrix of an antiglare layer of the present invention, it is desirable that ionizing radiation-curable resin such as ultraviolet ray-curable resin and electron beam-curable resin is used. The use of ionizing radiation-curable resin makes it possible to manufacture an antiglare film having a certain degree of flexibility, no crack and high hardness, for example, beyond 3H.

An organic particle A using in an antiglare layer of an antiglare film of the present invention is selected from acryl particle (refraction index 1.49), acryl styrene particle (refraction index 1.49-1.59), polystyrene particle (refraction index 1.59), polycarbonate particle (refraction index 1.58), melamine particle (refraction index 1.66) or the like.

Among them, it is desirable that a styrene particle is used as an organic particle A. In the case where an acrylic ionizing radiation-curing resin is used as a binder matrix, the refraction index is 1.45-1.55. On the other hand, a refraction index of a styrene particle is 1.59. Therefore the difference in refraction indices between a styrene particle and a binder matrix is enough big, and a styrene particle has general versatility and is low in cost. Accordingly a styrene particle is preferably used. In the case where only a polystyrene particle is included into a binder matrix, a polystyrene particle tends to be localized in an antiglare layer because of aggregation. Localization of a polystyrene particle can be controlled by an antiglare layer including a particle B in addition to a polystyrene particle.

Further, a particle B used in the present invention is selected from organic particles such as acryl particle (refraction index 1.49), acryl-styrene particle (refraction index 1.49-1.59), polystyrene particle (refraction index 1.59), polycarbonate particle (refraction index 1.58) and melamine particle (refraction index 1.66), and inorganic particles such as silica particle (refraction index 1.46), talc (refraction index 1.54), various aluminosilicate (refraction index 1.50-1.60), kaolin clay (refraction index 1.53) and MgAl hydrotalcite (refraction index 1.50).

Further, as mentioned above, an organic particle A and particle B, used in an antiglare layer of an antiglare film of the present invention, are preferably different kind. But they may be same kind. When a particle A and a particle B are same kind, it is desirable that an average particle size of a particle B is equal to or more than the value that an average particle size of an organic particle A is multiplied by 0.3, and equal to or less than the value that the same is multiplied by 0.5. That is, as long as the difference between an average particle size of an organic particle A and the same of a particle B is enough big, an organic particle A and a particle B can be same kind.

As a fluorinated material to control localization of an organic particle A used in the present invention, fluorinated additive used as a surface modifier can be used. Specifically, perfluoro alkyl ethylene oxide addition product, perfluorobutyl sulphonate, perfluoroalkyl group-containing phosphoric ester, oligomer containing perfluoro alkyl group and lipophilic group and oligomer containing perfluoro alkyl group, hydrophilic group and lipophilic group.

In an antiglare layer, a coating liquid including a starting material of a binder matrix and the aforementioned particle is coated to the base material. Then, the antiglare layer can be obtained on a base material by drying and curing the coating liquid.

In addition, the coating liquid may contain a solvent if necessary.

The solvent need to be able to disperse the aforementioned starting material of the binder matrix and the aforementioned particle. In addition, the solvent is required to be provided with coating aptitude. For example, toluene, cyclohexanone, acetone, ketone, ethylcellosolve, ethyl acetate, butyl acetate, methyl isobutyl ketone, isopropanol, methyl ethyl ketone, tetrahydrofuran, nitromethane, 1,4-dioxan, dioxolane, N-methylpyrrolidone, methylacetate, dichloromethane, trichloromethane, trichloroethylene, ethylene chloride, trichloroethane, tetra chloroethane, N,N-dimethylformamide and chloroform can be used and a combined solvent thereof can be used. Further, the amount of the solvent is not particularly limited.

Further, at this time, a solvent which can dissolve a transparent base material can be used. In particular, in the case where triacetylcellulose (TAC) is used for a transparent base material and an antiglare layer is formed on the base material made of triacetylcellulose, it is desirable that a solvent which can dissolve triacetylcellulose is used in order to improve adhesion property between an antiglare layer and a base material. More preferably, a mixed solvent comprised of a solvent which dissolves a base material and a solvent which does not dissolve a base material is used.

As a coating method, a roll coater, a reverse roll coater, a gravure coater, a knife coater, a bar coater or a slot die coater can be used.

Further, the solid content concentration of the coating liquid differs depending on a coating method. The solid content concentration may be around 30-70 wt % in weight ratio.

The case, where a curable resin is used as a binder matrix and an antiglare layer is formed, is described. The aforementioned coating liquid is coated on the base material. Then, by applying external energy such as ultraviolet rays, electron beams or heat to the coated layer, the coated layer is cured. Thus, the antiglare layer is formed. In the case of curing of ultraviolet, such light sources as a high-pressure mercury lamp, a low-pressure mercury lamp, an ultrahigh-pressure mercury lamp, a metal halide lamp, a carbon arc lamp and a xenon arc lamp can be utilized. Further, in the case of electron beam curing, electron beams emitted from various types of electron beam accelerators such as of Cockroft-Walton type, Vandegraph type, resonance transformation type, insulated core transformer type, linear type, Dynamitron type and radio-frequency type, can be utilized. The electron beam has an energy of preferably 50-1000 KeV, more preferably 100-300 KeV.

At this time, before and after the curing process, a drying process may be provided. Further, the curing and drying may be effected simultaneously. Examples of drying mean include heating, air blowing and hot air blowing.

Next, a method for forming an antiglare layer by using a thermoplastic binder matrix is described below. The coating liquid is coated on the base material. Then, the coated layer is dried. Thus an antiglare layer is formed. Examples of drying mean include heating, air blowing and hot air blowing.

Next, a method for forming an antiglare layer by using an inorganic or organic-inorganic composite matrix is described below. The coating liquid is coated on the base material. Then, by applying external energy such as ultraviolet rays, electron beams or heat, the coated layer is cured. Thus, an antiglare layer is formed. In addition, before and after the curing process, a drying process may be provided. Further, the curing and drying may be effected simultaneously. Examples of drying mean include heating, air blowing and hot air blowing.

Further, in the case where a polarizing plate having a polarizing layer between a pair of supports for the polarizing layer is used as the base material, the antiglare film can be manufactured as follows: First, among a pair of supports for the polarizing layer, a first support for the polarizing layer is provided with an antiglare layer. It can be provided in a way similar to that described above.

Next, on the side of the support for the first polarizing layer facing to the side provided with the antiglare layer, a polarizing layer is provided. In the case where a polarizing plate is composed of a TAC film and stretched PVA film added with iodine, the stretched PVA film added with iodine is laminated while being stretched on a transparent base material to provide the polarizing layer. Next, a second transparent base material is provided on the polarizing layer. Or, it suffices that firstly a polarizing plate having a polarizing layer between a transparent base material is prepared and then the antiglare layer is provided on a transparent base material.

As mentioned above, an antiglare film of the present invention may further have an antireflection layer, a water-repelling layer, an antifouling layer etc. Further, a primer layer or a adhesion layer may be provided in order to improve the adhesiveness between the transparent base material and the antiglare layer, or to improve the adhesiveness between respective layers.

As mentioned above, in an antiglare film of the present invention, to a binder matrix, other functional additives may be added. But, it is desirable that other functional additives do not affect transparency, light diffuseness etc. Examples of the usable functional additive include an antistatic agent, an ultraviolet absorber, an infrared absorber, an antifouling agent, a water repellent agent, a refraction index-adjusting agent, an adhesiveness-improving agent and a curing agent. An antiglare layer can have functions such as an antistatic function, an ultraviolet absorbing function, an infrared absorbing function, an antifouling function and a water repellent function besides an antiglare function.

Further, an antiglare film may include a functional layer having reflection preventing performance, antistatic performance, antifouling performance, electromagnetic shield performance, infrared absorbing performance, ultraviolet absorbing performance, color correction performance or the like, if necessary. And, a primer layer, an adhesion layer or the like can be provided between some layers in order to improve adhesion property between some kinds of layers.

The above-mentioned antiglare film allows an antiglare film to have a high image sharpness property.

Example 1

A triacetylcellulose film (manufactured by Fuji Photo Film Co., LTD TD-80U, refraction index 1.49, film thickness 80 μm) was used as a transparent base material. An ionizing radiation-curing resin, a solvent and a photopolymerization initiator, described in Table 1, were mixed with an organic particle A, a particle B and a fluorinated material, shown in Table 2 as a coating liquid a. The coating liquid was coated on a transparent base material comprised of a triacetylcellulose film by a slot die coater. Then, a solvent included in the coating liquid on the transparent base material was evaporated. Then, the antiglare layer was cured through ultraviolet irradiation of 400 mJ using a high-pressure mercury lamp under an atmosphere of 0.03% or less of oxygen concentration, and an antiglare layer was formed. Then, the dried and cured antiglare layer had a thickness of 6.4 μm. Thus, an antiglare layer of Example 1 was prepared.

Example 2

An antiglare film was prepared in the same way as in Example 1. However, a coating liquid having the composition shown in a coating liquid b in Table 2 was used instead of a coating liquid a shown in Table 2. Then, an average film thickness of a dried and cured antiglare layer was 6.5 μm.

Example 3

An antiglare film was prepared in the same way as in Example 1. However, a coating liquid having the composition shown in a coating liquid c in Table 2 was used instead of a coating liquid a shown in Table 2. Then, an average film thickness of a dried and cured antiglare layer was 6.3 μm.

Comparative Example 1

An antiglare film was prepared in the same way as in Example 1. However, a coating liquid having the composition shown in a coating liquid d in Table 2 was used instead of a coating liquid a shown in Table 2. Then, an average film thickness of a dried and cured antiglare layer was 7.0 μm.

Comparative Example 2

An antiglare film was prepared in the same way as in Example 1. However, a coating liquid having the composition shown in a coating liquid e in Table 2 was used instead of a coating liquid a shown in Table 2. Then, an average film thickness of a dried and cured antiglare layer was 6.2 μm.

Example 4

An antiglare film was prepared in the same way as in Example 1. However, a coating liquid having the composition shown in a coating liquid f in Table 2 was used instead of a coating liquid a shown in Table 2. Then, an average film thickness of a dried and cured antiglare layer was 6.5 µm.

Example 5

An antiglare film was prepared in the same way as in Example 1. However, a coating liquid having the composition shown in a coating liquid g in Table 2 was used instead of a coating liquid a shown in Table 2. Then, an average film thickness of a dried and cured antiglare layer was 6.7 µm.

Comparative Example 3

An antiglare film was prepared in the same way as in Example 1. However, a coating liquid having the composition shown in a coating liquid h in Table 2 was used instead of a coating liquid a shown in Table 2. Then, an average film thickness of a dried and cured antiglare layer was 6.8 µm.

Comparative Example 4

An antiglare film was prepared in the same way as in Example 1. However, a coating liquid having the composition shown in a coating liquid i in Table 2 was used instead of a coating liquid a shown in Table 2. Then, an average film thickness of a dried and cured antiglare layer was 6.4 µm.

Example 6

An antiglare film was prepared in the same way as in Example 1. However, a coating liquid having the composition shown in a coating liquid j in Table 2 was used instead of a coating liquid a shown in Table 2. Then, an average film thickness of a dried and cured antiglare layer was 6.7 µm.

Example 7

An antiglare film was prepared in the same way as in Example 1. However, a coating liquid having the composition shown in a coating liquid k in Table 2 was used instead of a coating liquid a shown in Table 2. Then, an average film thickness of a dried and cured antiglare layer was 6.5 µm.

Comparative Example 5

An antiglare film was prepared in the same way as in Example 1. However, a coating liquid having the composition shown in a coating liquid l in Table 2 was used instead of a coating liquid a shown in Table 2. Then, an average film thickness of a dried and cured antiglare layer was 6.7 µm.

Comparative Example 6

An antiglare film was prepared in the same way as in Example 1. However, a coating liquid having the composition shown in a coating liquid m in Table 2 was used instead of a coating liquid a shown in Table 2. Then, an average film thickness of a dried and cured antiglare layer was 6.3 µm.

Example 8

An antiglare film was prepared in the same way as in Example 1. However, a coating liquid having the composition shown in a coating liquid n in Table 2 was used instead of a coating liquid a shown in Table 2. Then, an average film thickness of a dried and cured antiglare layer was 6.8 µm.

Example 9

An antiglare film was prepared in the same way as in Example 1. However, a coating liquid having the composition shown in a coating liquid o in Table 2 was used instead of a coating liquid a shown in Table 2. Then, an average film thickness of a dried and cured antiglare layer was 6.5 µm.

Example 10

An antiglare film was prepared in the same way as in Example 1. However, a coating liquid having the composition shown in a coating liquid p in Table 2 was used instead of a coating liquid a shown in Table 2. Then, an average film thickness of a dried and cured antiglare layer was 6.7 µm.

Example 11

An antiglare film was prepared in the same way as in Example 1. However, a coating liquid having the composition shown in a coating liquid q in Table 2 was used instead of a coating liquid a shown in Table 2. Then, an average film thickness of a dried and cured antiglare layer was 6.6 µm.

Example 12

An antiglare film was prepared in the same way as in Example 1. However, a coating liquid having the composition shown in a coating liquid r in Table 2 was used instead of a coating liquid a shown in Table 2. Then, an average film thickness of a dried and cured antiglare layer was 6.5 µm.

Example 13

An antiglare film was prepared in the same way as in Example 1. However, a coating liquid having the composition shown in a coating liquid s in Table 2 was used instead of a coating liquid a shown in Table 2. Then, an average film thickness of a dried and cured antiglare layer was 6.5 µm.

Example 14

An antiglare film was prepared in the same way as in Example 1. However, a coating liquid having the composition shown in a coating liquid t in Table 2 was used instead of a coating liquid a shown in Table 2. Then, an average film thickness of a dried and cured antiglare layer was 6.4 µm.

Example 15

An antiglare film was prepared in the same way as in Example 1. However, a coating liquid having the composition shown in a coating liquid u in Table 2 was used instead of a coating liquid a shown in Table 2. Then, an average film thickness of a dried and cured antiglare layer was 6.5 µm.

TABLE 1

| Material type | Material | Part by weight |
| --- | --- | --- |
| Ionizing radiation-curing resin | pentaerythritol triacrylate (manufactured by KYOEISHA CHEMICAL Co., LTD.) | 95 |
| Solvent | Toluene | 100 |
| Photopolymerization intiator | Irgacure 184 (manufactured by Ciba Specialty Chemicals) | 5 |

TABLE 2

| Coating liquid | Material type | Material | Part by eight | Film thickness of an antiglare layer (H) |
|---|---|---|---|---|
| Coating liquid a | Organic particle A | Styrene bead (average particle size (ra): 3.5 μm) | 9 | 6.4 μm |
| | Particle B | Silica particle (average particle size (rb): 1.7 μm) | 13 | |
| | Fluorinated material | MEGAFAC F475 (manufactured by Dainippon Ink) | 0.5 | |
| Coating liquid b | Organic particle A | Styrene bead (average particle size (ra): 4.5 μm) | 8 | 6.5 μm |
| | Particle B | Silica particle (average particle size (rb): 1.7 μm) | 13 | |
| | Fluorinated material | MEGAFAC F475 (manufactured by Dainippon Ink) | 0.5 | |
| Coating liquid c | Organic particle A | Styrene bead (average particle size (ra): 2.7 μm) | 12 | 6.3 μm |
| | Particle B | Silica particle (average particle size (rb): 1.7 μm) | 13 | |
| | Fluorinated material | MEGAFAC F475 (manufactured by Dainippon Ink) | 0.5 | |
| Coating liquid d | Organic particle A | Styrene bead (average particle size (ra): 5.8 μm) | 7 | 7.0 μm |
| | Particle B | Silica particle (average particle size (rb): 1.7 μm) | 13 | |
| | Fluorinated material | MEGAFAC F475 (manufactured by Dainippon Ink) | 0.5 | |
| Coating liquid e | Organic particle A | Styrene bead (average particle size (ra): 1.9 μm) | 14 | 6.2 μm |
| | Particle B | Silica particle (particle size 0.8 μm) | 13 | |
| | Fluorinated material | MEGAFAC F475 (manufactured by Dainippon Ink) | 0.5 | |
| Coating liquid f | Organic particle A | Styrene bead (average particle size (ra): 3.5 μm) | 9 | 6.5 μm |
| | Particle B | Silica particle (average particle size (rb): 2.3 μm) | 13 | |
| | Fluorinated material | MEGAFAC F475 (manufactured by Dainippon Ink) | 0.5 | |
| Coating liquid g | Organic particle A | Styrene bead (average particle size (ra): 3.5 μm) | 9 | 6.7 μm |
| | Particle B | Silica particle (average particle size (rb): 1.2 μm) | 15 | |
| | Fluorinated material | MEGAFAC F475 (manufactured by Dainippon Ink) | 0.5 | |
| Coating liquid h | Organic particle A | Styrene bead (average particle size (ra): 3.5 μm) | 9 | 6.8 μm |
| | Particle B | Silica particle (average particle size (rb): 2.8 μm) | 13 | |
| | Fluorinated material | MEGAFAC F475 (manufactured by Dainippon Ink) | 0.5 | |
| Coating liquid i | Organic particle A | Styrene bead (average particle size (ra): 3.5 μm) | 9 | 6.4 μm |
| | Particle B | Silica particle (average particle size (rb): 0.8 μm) | 17 | |
| | Fluorinated material | MEGAFAC F475 (manufactured by Dainippon Ink) | 0.5 | |
| Coating liquid j | Organic particle A | Styrene bead (average particle size (ra): 3.5 μm) | 9 | 6.7 μm |
| | Particle B | Silica particle (average particle size (rb): 1.7 μm) | 18 | |
| | Fluorinated material | MEGAFAC F475 (manufactured by Dainippon Ink) | 0.5 | |
| Coating liquid k | Organic particle A | Styrene bead (average particle size (ra): 3.5 μm) | 10 | 6.5 μm |
| | Particle B | Silica particle (average particle size (rb): 1.7 μm) | 5 | |
| | Fluorinated material | MEGAFAC F475 (manufactured by Dainippon Ink) | 0.5 | |

TABLE 3

| Coating liquid | Material type | Material | Part by eight | Film thickness of an antiglare layer (H) |
|---|---|---|---|---|
| Coating liquid l | Organic particle A | Styrene bead (average particle size (ra): 3.5 μm) | 9 | 6.7 μm |
| | Particle B | Silica particle (average particle size (rb): 1.7 μm) | 20 | |
| | Fluorinated material | MEGAFAC F475 (manufactured by Dainippon Ink) | 0.5 | |
| Coating liquid m | Organic particle A | Styrene bead (average particle size (ra): 3.5 μm) | 9 | 6.3 μm |
| | Particle B | Silica particle (average particle size (rb): 1.7 μm) | 4 | |
| | Fluorinated material | MEGAFAC F475 (manufactured by Dainippon Ink) | 0.5 | |
| Coating liquid n | Organic particle A | Styrene bead (average particle size (ra): 3.5 μm) | 18 | 6.8 μm |
| | Particle B | Silica particle (average particle size (rb): 1.7 μm) | 13 | |
| | Fluorinated material | MEGAFAC F475 (manufactured by Dainippon Ink) | 0.5 | |
| Coating liquid o | Organic particle A | Styrene bead (average particle size (ra): 3.5 μm) | 6 | 6.5 μm |
| | Particle B | Silica particle (average particle size (rb): 1.7 μm) | 11 | |
| | Fluorinated material | MEGAFAC F475 (manufactured by Dainippon Ink) | 0.5 | |
| Coating liquid p | Organic particle A | Styrene bead (average particle size (ra): 3.5 μm) | 20 | 6.7 μm |
| | Particle B | Silica particle (average particle size (rb): 1.7 μm) | 15 | |
| | Fluorinated material | MEGAFAC F475 (manufactured by Dainippon Ink) | 0.5 | |
| Coating liquid q | Organic particle A | Styrene bead (average particle size (ra): 3.5 μm) | 5 | 6.6 μm |
| | Particle B | Silica particle (average particle size (rb): 1.7 μm) | 10 | |
| | Fluorinated material | MEGAFAC F475 (manufactured by Dainippon Ink) | 0.5 | |
| Coating liquid r | Organic particle A | Styrene bead (average particle size (ra): 3.5 μm) | 13 | 6.5 μm |
| | Particle B | Silica particle (average particle size (rb): 1.7 μm) | 13 | |
| | Fluorinated material | MEGAFAC F475 (manufactured by Dainippon Ink) | 0.9 | |
| Coating liquid s | Organic particle A | Styrene bead (average particle size (ra): 3.5 μm) | 9 | 6.5 μm |
| | Particle B | Silica particle (average particle size (rb): 1.7 μm) | 13 | |
| | Fluorinated material | MEGAFAC F475 (manufactured by Dainippon Ink) | 0.07 | |
| Coating liquid t | Organic particle A | Styrene bead (average particle size (ra): 3.5 μm) | 9 | 6.4 μm |
| | Particle B | Silica particle (average particle size (rb): 1.7 μm) | 13 | |
| | Fluorinated material | MEGAFAC F475 (manufactured by Dainippon Ink) | 1.1 | |
| Coating liquid u | Organic particle A | Styrene bead (average particle size (ra): 3.5 μm) | 9 | 6.5 μm |
| | Particle B | Silica particle (average particle size (rb): 1.7 μm) | 13 | |
| | Fluorinated material | MEGAFAC F475 (manufactured by Dainippon Ink) | 0.05 | |

About an antiglare film obtained in Examples and Comparative Examples, an appearance, antiglare property (external light reflection preventive property) and image sharpness property were evaluated in the following method.

Evaluation of Appearance

Respective antiglare films obtained in Examples and Comparative Examples were laminated to respective black plastic plates, and in that state, the respective antiglare films were evaluated visually. The judgment standard is shown below.

◎: streak and unevenness are absolutely not recognized
○: small streak and unevenness are recognized, but the defects are not noticeable.
x: streak and unevenness are easily recognized, and the defects are noticeable.

Evaluation of an External Light Reflection Preventive Property (Antiglare Property)

Respective antiglare films obtained in Examples and Comparative Examples were laminated to respective black plastic plates, and in that state, the reflection of fluorescent light was evaluated visually. The judgment standard is shown below.

◎: reflecting image is almost lost,
○: reflecting image is a little lost, and the remained image is not noticeable.
x: reflecting image is sharp and the image is noticeable Evaluation of an Image Sharpness Property Respective antiglare films were measured according to JIS K7105 using an image clarity meter (manufactured by Suga Test Instruments co., ltd.) by transmission method. The value which the respective image sharpness degrees measured by using optical combs having width of 0.125 mm, width of 0.5 mm, width of 1.0 mm and width of 2.0 mm were summed up, was used. The judgment standard is shown below.

◎: the value which the image sharpness degrees measured by using respective optical combs were summed up is more than 180%.

○: the value which the image sharpness degrees measured by using respective optical combs were summed up is equal to or more than 100% and less than 180%.

x: the value which the image sharpness degrees measured by using respective optical combs were summed up is less than 100%.

Evaluation results of respective samples were shown in Table 4

TABLE 4

| | Coating liquid | ra/H | rb/ra | wb/wa | appearance | Antiglare property | Image sharpness property |
|---|---|---|---|---|---|---|---|
| Example 1 | a | 0.5 | 0.5 | 144 | ◎ | ◎ | ◎ |
| Example 2 | b | 0.7 | 0.4 | 163 | ◎ | ◎ | ◎ |
| Example 3 | c | 0.4 | 0.6 | 108 | ◎ | ◎ | ◎ |
| Comparative Example 1 | d | 0.8 | 0.3 | 186 | X | ◎ | ○ |
| Comparative Example 2 | e | 0.3 | 0.4 | 93 | ◎ | X | ◎ |
| Example 4 | f | 0.5 | 0.7 | 144 | ◎ | ◎ | ◎ |
| Example 5 | g | 0.5 | 0.3 | 167 | ◎ | ◎ | ◎ |
| Comparative Example 3 | h | 0.5 | 0.8 | 144 | ◎ | ◎ | X |
| Comparative Example 4 | i | 0.5 | 0.2 | 189 | ○ | ◎ | X |
| Example 6 | j | 0.5 | 0.5 | 200 | ◎ | ◎ | ◎ |
| Example 7 | k | 0.5 | 0.5 | 50 | ◎ | ◎ | ◎ |
| Comparative Example 5 | l | 0.5 | 0.5 | 222 | ◎ | ◎ | X |
| Comparative Example 6 | m | 0.6 | 0.5 | 44 | ◎ | ○ | X |
| Example 8 | n | 0.5 | 0.5 | 72 | ◎ | ◎ | ◎ |
| Example 9 | o | 0.5 | 0.5 | 183 | ◎ | ◎ | ◎ |
| Example 10 | p | 0.5 | 0.5 | 75 | ○ | ◎ | ○ |
| Example 11 | q | 0.5 | 0.5 | 200 | ◎ | ○ | ◎ |
| Example 12 | r | 0.5 | 0.5 | 144 | ◎ | ◎ | ◎ |
| Example 13 | s | 0.5 | 0.5 | 144 | ◎ | ◎ | ◎ |
| Example 14 | t | 0.5 | 0.5 | 144 | ◎ | ◎ | ○ |
| Example 15 | u | 0.5 | 0.5 | 144 | ◎ | ○ | ◎ |

※ ra/H: an average particle size of an organic particle A/an average film thickness of an antiglare layer
☐ rb/ra: an average particle size of a particle B/an average particle size of an organic particle A
☐ wb/wa: the content of a particle B in an antiglare layer (coating liquid)/the content of an organic particle A in an antiglare layer From the mentioned above, an antiglare film, obtained by Example 1 to Example 15, has an antiglare layer which the value that an average particle size (ra) of an organic particle A (12A) is divided by an average film thickness (H) of an antiglare layer is in the range of 0.4 to 0.7, the value that an average particle size (rb) of a particle B (12B) is divided by an average particle size (ra) of an organic particle A (12A) is in the range of 0.3 to 0.7 and the content of a particle B relative to an organic particle A is in the range of 50 wt % to 200 wt %, thereby the film has a high image sharpness property, no defective appearance and enough external light reflection preventive property (antiglare property).

What is claimed is:

1. An antiglare film comprising:
   a transparent base material; and
   an antiglare layer having a surface irregularity over the transparent base material,
   wherein the antiglare layer includes a binder matrix, an organic particle (A), a particle (B), and a fluorinated material,
   wherein the value that an average particle size of the organic particle (A) is divided by an average film thickness of the antiglare layer is in the range of 0.4 to 0.7, and the value that an average particle size of the particle (B)

is divided by an average particle size of the organic particle (A) is in the range of 0.3 to 0.7, and the content of the particle (B) is in the range of 50 wt % to 200 wt % based on 100 wt % of the organic particle (A) and wherein the content of the fluorinated material in the antiglare layer is in the range of 0.07 wt % to 0.9 wt % based on 100 wt % of the binder matrix.

2. The antiglare film according to claim 1, wherein the content of the organic particle (A) is in the range of 6 wt % to 18 wt % based on 100 wt % of the binder matrix.

3. The antiglare film according to claim 1, wherein the organic particle (A) is a polystyrene particle.

4. A transmission type liquid crystal display comprising:
the antiglare film according to claim 1;
and arranged in that order from said antiglare film, a first polarizing plate, a liquid crystal cell, a second polarizing plate and a backlight unit.

5. The antiglare film according to claim 1, wherein the fluorinated material is a fluorinated additive.

6. The antiglare film according to claim 1, wherein the fluorinated material is selected from a group consisting of perfluoro alkyl ethylene oxide addition product, perfluorobutyl sulphonate, perfluoroalkyl group-containing phosphoric ester, oligomer containing perfluoro alkyl group and lipophilic group and oligomer containing perfluoro alkyl group, hydrophilic group and lipophilic group.

7. An antiglare film comprising:
a transparent base material; and
an antiglare layer having a surface irregularity over the transparent base material,
wherein the antiglare layer includes a binder matrix, an organic particle (A), a particle (B) and a fluorinated material,
wherein the value that an average particle size of the organic particle (A) is divided by an average film thickness of the antiglare layer is in the range of 0.4 to 0.7, and the value that an average particle size of the particle (B) is divided by an average particle size of the organic particle (A) is in the range of 0.3 to 0.7, and the content of the particle (B) is in the range of 50 wt % to 200 wt % based on 100 wt % of the organic particle (A),
wherein the content of the fluorinated material in the antiglare layer is in the range of 0.07 wt % to 0.9 wt % based on 100 wt % of the binder matrix,
wherein the content of the organic particle (A) is in the range of 6 wt % to 18 wt % based on 100 wt % of the binder matrix,
wherein the organic particle (A) is a polystyrene particle,
wherein the fluorinated material is a fluorinated additive,
wherein the fluorinated material is selected from a group consisting of perfluoro alkyl ethylene oxide addition product, perfluorobutyl sulphonate, perfluoroalkyl group-containing phosphoric ester, oligomer containing perfluoro alkyl group and lipophilic group and oligomer containing perfluoro alkyl group, hydrophilic group and lipophilic group.

* * * * *